United States Patent [19]

Yusa et al.

[11] 4,206,290
[45] Jun. 3, 1980

[54] FIRE RETARDANT RESINOUS COMPOSITIONS

[75] Inventors: Haruhiko Yusa; Masanori Oota; Kazuo Takahashi; Humio Akutsu, all of Iwaki, Japan

[73] Assignee: Kureha Kagaku Kogyo Kabushiki Kaisha, Tokyo, Japan

[21] Appl. No.: 933,040

[22] Filed: Aug. 11, 1978

Related U.S. Application Data

[63] Continuation of Ser. No. 737,982, Nov. 2, 1976, abandoned.

[30] Foreign Application Priority Data

Nov. 6, 1975 [JP] Japan ................ 50-132477

[51] Int. Cl.$^2$ ............... C08L 55/02; C08L 29/10
[52] U.S. Cl. .................... 525/79; 525/227; 525/230; 525/231; 260/DIG. 24
[58] Field of Search ............... 260/876 R, 891

[56] References Cited

U.S. PATENT DOCUMENTS

| | | | |
|---|---|---|---|
| 2,807,603 | 9/1957 | Parks et al. | 260/891 |
| 3,168,594 | 2/1965 | Hoshi et al. | 260/876 R |
| 3,444,267 | 5/1969 | Beer | 260/876 R |
| 3,636,138 | 1/1972 | Beer | 260/876 R |
| 3,673,282 | 6/1972 | Baer | 260/876 R |
| 3,682,857 | 8/1972 | Harris et al. | 260/876 R |
| 3,780,134 | 12/1973 | Lonning | 260/876 R |
| 3,901,839 | 8/1975 | Lonning | 270/876 R |
| 3,936,417 | 2/1976 | Ronden | 260/876 R |
| 3,985,693 | 10/1976 | Lonning | 260/876 R |

*Primary Examiner*—Carman J. Seccuro
*Attorney, Agent, or Firm*—Wenderoth, Lind & Ponack

[57] ABSTRACT

A resinous composition having fire retardance, impact resistance and easy workability is obtained by blending (1) about 80 to 30 parts by weight of an ABS resin with (2) about 20 to 70 parts by weight of (i) a vinyl chloride resin compound comprising 100 to 5 parts by weight of a copolymer resin consisting essentially of 0.5 to 40% by weight of a higher alkyl vinyl ether and 99.5 to 60% by weight of vinyl chloride and (ii) 0 to 95 parts by weight of a polyvinyl chloride resin.

14 Claims, No Drawings

FIRE RETARDANT RESINOUS COMPOSITIONS

This is a continuation of application Ser. No. 737,982, filed Nov. 2, 1976, and now abandoned.

BACKGROUND OF THE INVENTION

1. Field of the Invention

This invention relates to a novel ABS resin composition improved in fire retardance and workability. More particularly, this invention relates to a resinous composition comprising a blend mixture of an ABS resin and either a copolymer resin consisting essentially of vinyl chloride and a higher alkyl vinyl ether or a vinyl chloride resin compound containing the copolymer.

2. Description of the Prior Art

ABS resins (acrylonitrile-butadiene-styrene resins) are of easy-combustibility, and a fire-retarded ABS resin has been keenly needed.

ABS resins have been generally incorporated with fire retardant additives such as halogen-containing compounds and phosphorus-containing compounds and, if desired, together with fire retardant auxiliaries such as antimony trioxide.

Especially, vinyl chloride resins (hereinafter referred to as PVC) have been widely employed as a fire retardant for ABS resins, since PVC is readily blended with ABS resins and does not cause decrease in mechanical strength, and bleeding and weathering after a long time of use unlike the case where low-molecular retardant additives such as halogen compounds are employed.

As noted above PVC is an excellent fire retardant for ABS resin, but there remain some processing problems owing to the difference in heat stabilities between PVC and ABS resin. This is, PVC is inferior in heat stability to ABS resin. When a blend of PVC and ABS resin is molded at a temperature suitable for processing ABS resin, PVC undergoes thermal decomposition. On the other hand, when the blend is processed at a lower temperature suitable for PVC, the processing of the blend is extremely difficult because of its very high melt viscosity.

Addition of plasticizers such as dioctyl phthalate and dibutyl phthalate has been proposed so as to eliminate these defects, but this method results in decrease in the heat distortion temperature of the blend as well as deterioration of fire retardance and great decrease in stiffness inherent in ABS resin compositions.

SUMMARY OF THE INVENTION

A series of studies have been made by the present inventors so as to eliminate these defects of PVC to be employed as a fire retardant for ABS resin. The inventors have employed a copolymer resin of a higher alkyl vinyl ether and vinyl chloride or a blend thereof with polyvinyl chloride in place of PVC in ABS resin compositions, and have found that the resulting resinous composition has a satisfactory flow property even at a temperature suitable for processing PVC resin in the same degree as ABS resins and exhibits an excellent heat stability.

An object of the invention is thus to provide a high-impact resinous composition which is fire retardant and very excellent in workability or processability.

Other and further objects, features and advantages of the invention will appear more fully from the following description.

In accordance with the present invention, there is provided a resinous composition having good flow property and fire retardance comprising a blend of (1) about 80 to 30 parts by weight of an ABS resin and (2) about 20 to 70 parts by weight of a vinyl chloride resin compound comprising (i) 100 to 5 parts by weight of a copolymer resin of about 0.5 to 40% by weight of a higher alkyl vinyl ether and about 99.5 to 60% by weight of vinyl chloride and (ii) 0 to 95 parts by weight of a polyvinyl chloride resin.

The resinous composition of the present invention can be advantageously utilized substantially in the same use as conventional ABS resin compositions are employed.

DETAILED DESCRIPTION OF THE INVENTION

(1) Components of the Resinous Compositions

(a) ABS Resin

The ABS resin, one of the main components of the present composition, is basically a ternary polymer comprising polymerized acrylonitrile, or, more broadly a vinyl cyanide, butadiene and styrene or, more broadly, an aromatic vinyl, containing, if desired, a further monomer component such as methyl methacrylate.

Conventional ABS resins are products of polymerization of acrylonitrile and styrene or, more broadly, an aromatic vinyl, in the presence of a butadiene-based rubber polymer such as polybutadiene or a copolymer of butadiene and styrene (SBR). In the present invention, however, it should be understood that the term "ABS resin" encompasses, in addition to the conventional ABS resins, polymeric mixture of (1) a product of polymerization of either one of an aromatic vinyl such as styrene and a vinyl cyanide such as acrylonitrile and (2) a copolymer of an aromatic vinyl and a vinyl cyanide.

A part of the styrene can be replaced by another aromatic vinyl compound such as α-methylstyrene or a vinyl toluene, and the acrylonitrile can be partly replaced by a methacrylic ester such as methyl methacrylate. Moreover, a part or all of acrylonitrile may be replaced by methacrylonitrile.

The ABS resin to be generally employed in the present invention comprises about 10 to 40 parts by weight of a butadiene rubber component, about 80 to 25 parts by weight of an aromatic vinyl compound, and about 35 to 5 parts by weight of acrylonitrile. As to the butadiene rubber components, employed generally are polybutadiene and/or copolymers consisting of a major part of butadiene and aminor part of a monoolefinic monomer copolymerizable therewith such as styrene, acrylonitrile or vinylidene chloride.

The process for preparation of the ABS resin per se does not comprise any part of the present invention, and the resin is generally produced by either graft-polymerizing an aromatic vinyl and acrylonitrile (and/or methacrylonitrile) onto a butadiene polymer rubber, or graft polymerizing some parts of the grafting monomer components onto the rubber and then blending the resulting graft-polymer with an aromatic vinyl-acrylonitrile copolymer.

(b) Polyvinyl Chloride Resin Compound

The vinyl chloride resin compound to be employed as a blending polymer in the present invention is (1) a copolymer resin consisting essentially of about 0.5 to 40% by weight of a higher alkyl vinyl ether and about 99.5 to 60% by weight of vinyl chloride (hereinafter referred to as HCA), or (2) a blend of less than 100% to about 5% by weight of the HCA and up to about 95%, viz. 0 (not inclusive) to about 95%, by weight of a polyvinyl chloride resin (preferably, vinyl chloride homopolymer resin). Such vinyl chloride resin compound is described in detail in Japanese Patent Publication No. 22733/1961.

When the copolymer resin contains less than about 0.5% by weight of a higher alkyl vinyl ether, the resulting resinous composition fails to have sufficient flow property. When the copolymer resin contains more than about 40% by weight of a higher alkyl vinyl ether, it has poor compatibility with the ABS resin and the resulting resinous composition fails to have good mechanical properties. In the same way, the amount of a higher alkyl vinyl ether component contained in the vinyl chloride resin compound is desirable to be not less than 0.5% by weight of the compound.

The higher alkyl vinyl ether of which the alkyl group contains 12 to 18 carbon atoms is generally employed in the present invention. When an alkyl vinyl ether having the alkyl group of less than 12 carbon atoms is used, the resulting resinous composition is inferior in workability. The alkyl vinyl ether having more than 18 carbon atoms is not suitable since its copolymerizability with vinyl chloride is deteriorated. The suitable alkyl vinyl ethers are exemplified by vinyl ethers of lauryl, cetyl, stearyl, myristyl and the like. These copolymer resins are prepared by a conventional suspension or emulsion polymerization.

In one aspect of the present invention, the vinyl chloride resin compound comprises a blend of a polyvinyl chloride resin in a quantity up to 95% by weight of the blend. The polyvinyl chloride resin can be any of the resinous polymer of vinyl chloride, and is preferably a homopolymer of vinyl chloride.

(c) Impact Modifiers

The resinous composition of the present invention can be further incorporated with an impact modifier which has been employed in conventional vinyl chloride resins.

While ABS resins have excellent impact resistance, it is noted that, in the resinous composition of the present invention, the flow property in processing increases but impact resistance is lowered as the ratio of HCA contained in the vinyl chloride resin compound and the ratio of alkyl vinyl ether contained in the HCA become larger. The impact resistance of the present resinous composition can be advantageously improved by addition of a small amount of a conventional impact modifier without impairing its good processability. The amount of the impact modifier to be employed in the present resinous composition varies in accordance with the vinyl chloride resin compound to be employed. The impact modifier is generally used in an amount of not more than about 20 parts by weight to 100 parts by weight of the present resinous composition.

The impact modifiers for vinyl chloride resins are exemplified by MBS resin (a terpolymer resin of methyl methacrylate, butadiene and styrene, especially a butadiene rubber onto which monomer components comprising methyl methacrylate and styrene are graft-polymerized), a chlorinated polyethylene, and a ethylene-vinyl acetate copolymer rubber onto which vinyl chloride is graft polymerized, and the like. The impact modifiers for PVC on the market can be generally employed.

(d) Other Additives

As other additives, an antimony compound which is an effective fire retardant auxiliary such as antimony oxide, antimony trisulfide and triphenyl antimony can be used alone or in combination with other ordinary fire retardant additives.

The fire retardant additives generally employed in the resinous composition are exemplified by chlorinated paraffins, hexabromobenzene, tetrabromoethane, tetrabromobisphenol A, and the like.

Suitable amounts of heat stabilizers, lubricants and/or pigments which are generally used in PVC compounds can also be employed upon processing the resinous composition of the present invention.

The invention is further explained by way of the following examples, which are illustrative only and are not limitative.

EXAMPLES 1–10 AND COMPARATIVE EXAMPLES 1–2

In these examples employed were vinyl chloride-cetyl vinyl ether copolymers containing 10% and 5% of cetyl vinyl ether supplied by Kureha Kagaku Kogyo, Japan under the trade name HCA and homopolymers of vinyl chloride having a relatively good flow property supplied by Kureha Kagaku Kogyo under the trade name S9006 (degree of polymerization 600) and S9007 (degree of polymerization 700). They were blended with a commercially available ABS resin comprising 20% of acrylonitrile, 25% of butadiene and 55% of styrene on the weight basis, to obtain resinous compositions.

One part by weight of organotin maleate stabilizer (N2000E supplied by Nitto Chemical Industry Co., Japan) was added to 100 parts by weight of each of the resinous compositions, followed by kneading the mixture on a test roll having surface temperature of 150° C. to prepare sheets. The sheets were formed into test pieces by means of press molding.

Fire retardant tests are carried out in accordance with ASTM-D-635. The results were classified into "combustible", "slow-burning" and "incombustible", in which "slow-burning" and "incombustible" were evaluated as "pass" and "combustible" as "failure". Impact strength (Izod impact strength) and heat distortion temperature were measured according to JIS (Japanese Industrial Standard)-6871. Flow property (fluidity) was measured by an extruded amount of the sample resin by means of Koka flow tester (supplied by Shimazu Seisakusho, Japan) with a load of 150 kg/cm$^2$ and nozzle 0.1 cm$\phi \times$ 10cm and at a temperature of 200° C. The properties of the resulting resinous compositions are shown in the following Table 1.

In Table 1, the underlined numerals denote the values which do not satisfy the standards of the present resinous composition. The resinous composition which satisfies fire retardance, impact resistance, heat stability and flow property simultaneously can be readily obtained according to the present invention by blending ABS resins with the vinyl chloride resin compounds. When HCA is not employed, the composition is inferior in flow property (cf. comparative examples 4 and 5). The flow property itself may be enhanced by addition of a plasticizer such as DOP (dioctyl phthalate) to the composition, but heat distortion temperature is markedly lowered (cf. comparative examples 6 and 7). The data of the examples are clearly superior to those of the comparative examples.

The mixed resin compositions in which the amounts of vinyl chloride resin compounds are less than 20% by weight are not satisfactory in the degree of fire retardance (cf. comparative examples 1 and 2). The mixed resin compositions in which less than 30% by weight of ABS resins are contained are inferior in both impact strength and heat distortion temperature (cf. comparative example 3).

Table 1

| | | Compositions (parts by weight) | | | | Properties of the Resinous Compositions | | | |
|---|---|---|---|---|---|---|---|---|---|
| Examples No. | | ABS | HCA | PVC(1) | PVC(2) | Degree of Fire Retardance (ASTM-D-635) | Impact Strength (JIS-6871) (kg cm/cm) | Heat Distortion Temperature (JIS-6871) (°C. 18.5 kg/cm$^2$) | Fluidity (c.c./sec × 10$^{-2}$) |
| Examples of the Invention | 1 | 40 | 30 | 30 | — | incombustible (pass) | 25 | 72 | 6.2 |
| | 2 | 50 | 25 | 25 | — | incombustible (pass) | 36 | 74 | 5.9 |
| | 3 | 60 | 20 | 20 | — | incombustible (pass) | 40 | 76 | 4.5 |
| | 4 | 70 | 15 | 15 | — | slow-burning (pass) | 30 | 79 | 4.4 |
| | 5 | 80 | 10 | 10 | — | slow-burning (pass) | 27 | 83 | 4.2 |
| | 6 | 50 | 10 | — | 40 | incombustible (pass) | 61 | 77 | 3.2 |
| | 7 | 50 | 20 | — | 30 | incombustible (pass) | 58 | 75 | 3.5 |
| | 8 | 50 | 30 | — | 20 | incombustible (pass) | 35 | 73 | 4.9 |
| | 9 | 50 | 40* | — | 10 | incombustible (pass) | 25 | 75 | 5.3 |
| | 10 | 50 | 50* | — | — | incombustible (pass) | 20 | 73 | 5.9 |
| Comparative Examples | 1 | 100 | — | — | — | combustible (failure) | 42 | 85 | 2.5 |
| | 2 | 90 | 5 | — | 5 | combustible (failure) | 28 | 84 | 3.0 |
| | 3 | 20 | 40 | 40 | — | incombustible (pass) | 5 | 69 | 5.8 |
| | 4 | 50 | — | 50 | — | incombustible (pass) | 62 | 79 | 2.4 |
| | 5 | 50 | — | — | 50 | incombustible (pass) | 76 | 79 | 1.9 |
| | 6** | 50 | — | — | 50 | incombustible (pass) | 68 | 63 | 2.3 |
| | 7** | 50 | — | — | 50 | incombustible (pass) | 55 | 58 | 5.6 |

Note:
(a) The underlined values denote that the values are not satisfactory.
(b) *a vinyl chloride copolymer containing 5% of cetyl vinyl ether was used.
(c) PVC(1) and PVC(2) stand for PVC having degree of polymerization 600, and 700, respectively.
(d) **The resin compositions of comparative examples 6 and 7 were prepared by adding 6 parts (C. Ex. 6) or 10 parts (C. Ex. 7) by weight of DOP to the composition of comparative example 5, respectively.

EXAMPLES 11-13

These examples show the effects obtained by incorporating, to the resinous compositions of Examples 9 and 10, an MBS resin (BTA IIIs supplied by Kureha Kagaku Kogyo) sold as an impact modifier for vinyl chloride resins or a commercially available chlorinated polyethylene (ClPE), in the following Table 2.

Impact strength of the resinous composition can be readily be enhanced without impairing fire retardance, heat distortion temperature and fluidity thereof, as shown in the Table.

Table 2

| | | Composition (parts by weight) | | Properties of the Resinous Composition | | | |
|---|---|---|---|---|---|---|---|
| Example No. | | ** | BTA IIIs | Impact Strength JIS-6871 (kg cm/cm) | Fire Retardance ASTM-D-635 | Heat Distortion Temperature JIS-6871 (°C.) | Fluidity (c.c./sec × 10$^{-2}$) at 200° C. |
| Examples of Invention | 9 | 100 | 0 | 25 | incombustible (pass) | 75 | 5.3 |
| | 11 | 100 | 5 | 38 | incombustible (pass) | 74 | 5.0 |
| | 12 | 100 | 10 | 45 | incombustible (pass) | 72 | 4.9 |
| | | *** | ClPE* | | | | |
| | 10 | 100 | 0 | 20 | incombustible (pass) | 73 | 5.9 |
| | 13 | 100 | 5 | 35 | incombustible (pass) | 71 | 6.1 |

Note:
*ClPE stands for a chlorinated polyethylene having degree of chlorination 35%.
**The resinous composition of Example 9.
***The resinous composition of Example 10.

EXAMPLES 14-17 AND COMPARATIVE EXAMPLES 8-10

The resinous composition of Example 4 was mixed with the ordinary low-molecular fire retardant additives, namely antimony trioxide (Sb$_2$O$_2$) or hexabromobenzene (C$_6$Br$_6$). The results are shown in Table 3. Fire retardant effect was further exhibited by addition of a small amount of the fire retardant additive to the resinous composition of the present invention. Moreover, the fire retardant additive gave no substantially adverse effect to the other properties of the resinous composition.

On the other hand, a mixture of ABS resin alone and a small amount of the fire retardant additive (Sb$_2$O$_3$) scarcely exhibited a fire retardant effect, and impact strength thereof was markedly detriorated. The results are also shown in Table 3 (comparative examples 8, 9, and 10).

Table 3

Properties of the

Table 3-continued

| Example No. | Composition (parts by weight) | | Resinous Composition | |
|---|---|---|---|---|
| | Resin comp. of Example 4 | Fire retardant additives | Fire Retardance ASTM-D-635 | Impact Resistance JIS-6871 (kg.cm/cm) |
| Examples of the Invention 4 | 100 | 0 | Slow-burning (pass) | 30 |
| 14 | 100 | 2 ($Sb_2O_3$) | incombustible (pass) | 26 |
| 15 | 100 | 4 ($Sb_2O_3$) | incombustible (pass) | 22 |
| 16 | 100 | 2 ($C_6Br_6$) | incombustible (pass) | 29 |
| 17 | 100 | 4 ($C_6Br_6$) | incombustible (pass) | 28 |
| Comparative Examples | ABS Resin* | Fire retardant additive | | |
| 8 | 100 | 0 | combustible (failure) | 28 |
| 9 | 100 | 10 ($Sb_2O_3$) | combustible (failure) | 14 |
| 10 | 100 | 15 ($Sb_2O_3$) | combustible (failure) | 9 |

Note:
*ASB resin comprises 22% of acrylonitrile, 23% of butadiene and 50% of styrene.

EXAMPLES 18-20

Combinations of the following graft polymers prepared by polymerizing styrene, acrylonitrile and methylmethacrylate on a butadiene-based polymer, and a styrene-acrylontrile copolymer (AS resin) were chosen as ABS resins to be used in the present invention.

Graft Polymer (1)

To a latex containing 65 parts of a copolymer rubber of an average particle size of 0.3µ consisting of 90% by weight of butadiene and 10% by weight of styrene were added a monomer mixture consisting of 27 parts by weight of styrene containing 0.035 parts by weight of diisopropylbenzene hydroperoxide and 0.075 parts by weight of divinylbenzene and 8 parts by weight of acrylonitrile, and 10 parts by weight of distilled water containing 0.0175 parts by weight of formaldehyde sodium sulfoxylate. Then, polymerization was carried out continuously for 7 hours at a temperature of 60° C.

To the latex thus obtained were added 0.5 parts by weight each of ditertiarybutyl paracresol and dilaurylthiodipropionate, and thereafter the latex was subjected to coagulation with an aqueous solution of hydrochloric acid, washed with water, dehydrated and dried at 60° C., whereupon a graft polymer (ABS resin) was obtained in powder form. The polymerization yield was approximately 100%.

Graft Polymer (2)

Graft polymer (2) (MBS resin) was produced in the same manner as graft polymer (1) except that 27 parts by weight of styrene and 8 parts by weight of acrylonitrile polymerized on the rubber polymer in graft polymer (1) were substituted by 17.5 parts by weight of styrene and 17.5 parts by weight of methyl methacrylate.

Graft Polymer (3)

Graft polymer (3) (ABSM resin) was produced in the same manner as graft polymer (1) except that 27 parts by weight of styrene and 8 parts by weight of acrylonitrile polymerized on the rubber polymer in graft polymer (1) were substituted by 13.5 parts by weight of styrene, 17.5 by weight of methyl methacrylate and 4 parts by weight of acrylonitrile. AS Resin:

The following constituents were charged into a reaction vessel and after replacement of the atmosphere therein with nitrogen, polymerization was carried out continuously for 20 hours at a temperature of 60° C.

| | Parts by weight |
|---|---|
| styrene | 75 |
| acrylonitrile | 25 |
| tertiarydodecylmercaptan | 0.25 |
| azobisisobutyronitrile | 0.25 |
| polyethylene oxide | 0.3 |
| methylcellulose | 0.1 |
| distilled water | 100 |

The slurry obtained was dehydrated by a centrifugal separator, washed with water and dried at 80° C., whereupon a copolymer was obtained in bead form.

The reduced visicosity ($\eta sp/C$) of this copolymer in dimethylformamide of a concentration of 0.4 g/dl at 30° C. was 0.8 g/dl.

Each of the graft polymers and the AS resin thus prepared were blended with polyvinyl chloride compound in a dry state to produce resinous compositions.

A stabilizer was added and samples were prepared in the same manner as Example 1, which samples were used in the respective tests.

The properties of these resinous compositions are summarized in Table 4.

Table 4

| Example No. | Composition (Parts by weight) | | | | Properties of the Resinous Composition | | | |
|---|---|---|---|---|---|---|---|---|
| | Graft Polymer | AS | HCA*4 | PVC*5 | Fire retardance (ASTM-D-635) | Impact Resistance (JIS-6871) | Thermal Distortion Temperature (JIS-6871) | Fluidity (c.c./sec × $10^{-2}$) |
| 18 | 15*1 | 35 | 20 | 30 | incombustible (pass) | 75 kg. cm/cm² | 76° C. | 3.7 |
| 19 | 15*2 | 35 | 20 | 30 | incombustible (pass) | 47 kg. cm/cm² | 75° C. | 3.8 |
| 20 | 15*3 | 35 | 20 | 30 | incombustible (pass) | 63 kg. cm/cm² | 75° C. | 4.1 |

*1Graft polymer (1) (ABS resin)
*2Graft polymer (2) (MBS resin)
*3Graft polymer (3) (ABSM resin)
*4Copolymer of vinyl chloride containing 10% by weight of cetylvinyl ether
*5Polyvinyl chloride resin having degree of polymerization 600

Table 2 shows that the four resin mixtures prepared by blending graft polymers and AS resin with polyvinyl chloride compositions can achieve all the objects of the present invention, i.e., low combustibility, high impact strength, heat resistance and fludity under processing conditions.

While the invention has been particularly shown and described with reference to preferred embodiments thereof, it will be understood by these skilled in the art the foregoing and other changes can be made without departing from the spirit and scope of the invention.

Having thus described the invention, what is claimed as novel and desired to be secured by Letters Patent is:

1. A resinous composition having good flow property and fire resistance consisting essentially of a blend of (1) about 80 to 30 parts by weight of a vinyl cyanide-butadiene-aromatic vinyl resin and (2) about 20 to 70 parts by weight of a vinyl chloride resin consisting essentially of (i) 100 to 5 parts by weight of a copolymer resin of about 0.5 to 40% by weight of a higher alkyl vinyl ether having 12 to 18 carbon atoms in the alkyl group and about 99.5% to 60% by weight of vinyl chloride based on the total weight of said vinyl ether and vinyl chloride and (ii) 0 to 95 parts by weight of a polyvinyl chloride resin other than the copolymer resin (i).

2. The resinous composition as set forth in claim 1, in which said vinyl cyanide-butadiene-aromatic vinyl resin consists essentially of polymerized butadiene, at least one member selected from the group consisting of acrylonitrile and methacrylonitrile, and styrene.

3. The resinous composition as set forth in claim 2, in which styrene is employed as a mixture of styrene and an aromatic vinyl compound other than styrene and acrylonitrile is employed as a mixture of acrylonitrile and a methacrylate.

4. The resinous composition as set forth in claim 1, in which said vinyl cyanide-butadiene-aromatic vinyl resin consists essentially of about 10 to 40 parts by weight of a butadiene rubber component, about 80 to 25 parts by weight of styrene, and about 35 to 5 parts by weight of at least one member selected from the group consisting of acrylonitrile and methacrylonitrile.

5. The resinous composition as set forth in claim 4, in which said butadiene rubber component is at least one member selected from the group consisting of polybutadiene and a copolymer consisting essentially of a major part of butadiene and a minor part of monoolefinic monomers.

6. The resinous composition as set forth in claim 1, in which said vinyl cyanide-butadiene-aromatic vinyl resin consists essentially of (a) a graft polymer selected from the group consisting of graft polymers of acrylonitrile and styrene onto a butadiene-based polymer, graft polymers of methyl methacrylate and styrene onto a butadiene-based polymer and graft polymers of acrylonitrile, sytrene and methyl methacrylate onto a butadiene-based polymer, and (b) a copolymer consisting essentially of polymerized acrylonitrile and styrene.

7. The resinous composition as set forth in claim 1, in which said alkyl group is selected from the group consisting of lauryl, cetyl, stearyl and myristyl.

8. The resinous composition as set forth in claim 1, in which said vinyl chloride resin compound consists essentially of said copolymer of a higher alkyl vinyl ether and vinyl chloride.

9. The resinous composition as set forth in claim 1, in which said vinyl chloride resin compound consists essentially of said copolymer of a higher alkyl vinyl ether and vinyl chloride and polyvinyl chloride resin.

10. The resinous composition as set forth in claim 10, in which said vinyl chloride resin is a homopolymer of vinyl chloride.

11. The resinous composition as set forth in claim 1, in which not more than about 20 parts by weight of an impact modifier for vinyl chloride resins is incorporated to 100 parts by weight of the resinous composition.

12. The resinous composition as set forth in claim 11, in which said impact modifier is selected from the group consisting of an methyl methacrylate-butadiene-styrene resin, a chlorinated polyethylene, and an ethylene-vinyl acetate copolymer rubber onto which vinyl chloride has been graft polymerized.

13. The resinous composition as set forth in claim 1, in which an antimony compound is incorporated as a fire-retardant auxiliary into the resinous composition.

14. The resinous composition as set forth in claim 1, in which a fire retardant additive selected from the group consisting of chlorinated paraffins, hexabromobenzene, tetrabromoethane and tetrabromobisphenol A is incorporated into the resinous composition.

* * * * *